(12) United States Patent
Yamada

(10) Patent No.: US 9,875,362 B2
(45) Date of Patent: Jan. 23, 2018

(54) HASH VALUE GENERATION APPARATUS

(71) Applicant: CANON KABUSHIKI KAISHA, Tokyo (JP)

(72) Inventor: Shinya Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 14/038,922

(22) Filed: Sep. 27, 2013

(65) Prior Publication Data

US 2014/0122898 A1    May 1, 2014

(30) Foreign Application Priority Data

Oct. 31, 2012   (JP) .................. 2012-241106

(51) Int. Cl.
*G06F 21/60* (2013.01)
*G09C 1/00* (2006.01)
*H04L 9/06* (2006.01)

(52) U.S. Cl.
CPC ............. *G06F 21/602* (2013.01); *G09C 1/00* (2013.01); *H04L 9/0643* (2013.01); *H04L 2209/12* (2013.01)

(58) Field of Classification Search
CPC ..... H04L 9/0643; H04L 9/06; H04L 2209/12; H04L 2209/56; G06F 21/60; G06F 21/602; G09C 1/00
See application file for complete search history.

(56) References Cited

U.S. PATENT DOCUMENTS

| 2011/0040977 | A1* | 2/2011 | Farrugia et al. .............. 713/181 |
| 2013/0080734 | A1* | 3/2013 | Sato et al. .................... 711/207 |
| 2013/0275722 | A1* | 10/2013 | Yap et al. ..................... 712/208 |
| 2014/0016773 | A1* | 1/2014 | Wolrich ................. G06F 21/72 380/28 |

OTHER PUBLICATIONS

G. Bertoni, J. Daemen, M. Peeters, and G. Van Assche,The Keccak reference, Jan. 2011, http://keccak.noekeon.org/.*
B. Jungk and J. Apfelbeck, "Area-Efficient FPGA Implementations of the SHA-3 Finalists," Reconfigurable Computing and FPGAs (ReConFig), 2011 International Conference on, Cancun, 2011, pp. 235-241.*
"The KECCAK reference", Version 3.0, Jan. 14, 2011, http://keccak.noekeon.org/Keccak-reference-3.0.pdf.

* cited by examiner

Primary Examiner — Eleni Shiferaw
Assistant Examiner — Alexander Lapian
(74) Attorney, Agent, or Firm — Fitzpatrick, Cella, Harper & Scinto

(57) ABSTRACT

For enabling improvement in throughput for generating a hash value, a hash value generation apparatus comprises: a θ operation unit configured to execute a θ operation included in a round process of a SHA-3 algorithm; a ρ operation unit configured to execute a ρ operation included in the round process; a π operation unit configured to execute a π operation included in the round process; a χ operation unit configured to execute a χ operation included in the round process; and an ι operation unit configured to execute an ι operation included in the round process, wherein the θ operation unit receives data for each sheet structure, and starts to execute the θ operation upon receiving data of three sheet structures.

18 Claims, 16 Drawing Sheets

STATE STRUCTURE

PLANE STRUCTURE

SHEET STRUCTURE

LANE STRUCTURE

COLUMN STRUCTURE

STEP θ

STEP θ
(WHEN OBTAINING BIT AT X = 0)

PRIOR ART
FIG. 12
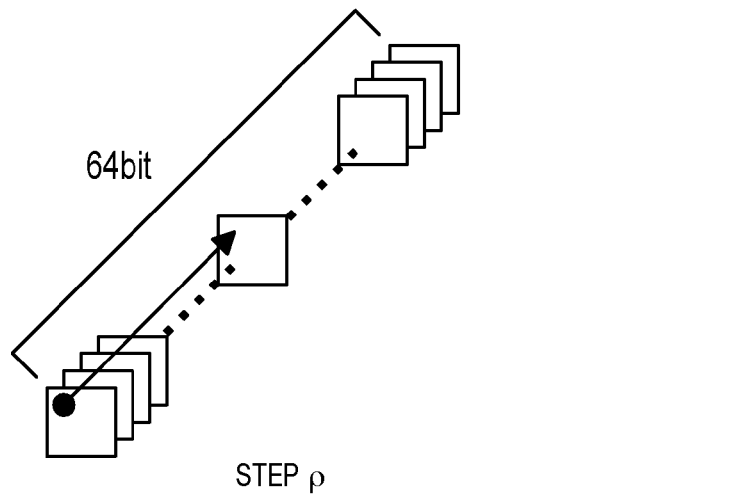
STEP ρ
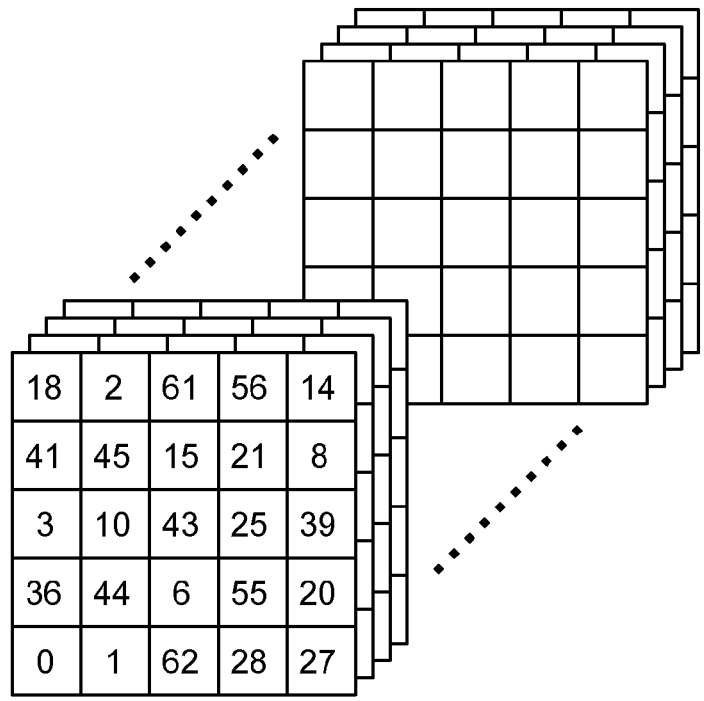
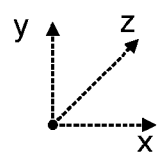
SHIFT AMOUNT IN EACH LANE

STEP π

STEP χ

PERFORMING XOR ON ROUND CONSTANT AGAINST LANE AT THIS POSITION

STEP ι

FIG. 16

| ROUND COUNT | ROUND CONSTANT |
| --- | --- |
| 1 | 0x0000000000000001 |
| 2 | 0x0000000000008082 |
| 3 | 0x800000000000808A |
| 4 | 0x8000000080008000 |
| 5 | 0x000000000000808B |
| 6 | 0x0000000080000001 |
| 7 | 0x8000000080008081 |
| 8 | 0x8000000000008009 |
| 9 | 0x000000000000008A |
| 10 | 0x0000000000000088 |
| 11 | 0x0000000080008009 |
| 12 | 0x000000008000000A |
| 13 | 0x000000008000808B |
| 14 | 0x800000000000008B |
| 15 | 0x8000000000008089 |
| 16 | 0x8000000000008003 |
| 17 | 0x8000000000008002 |
| 18 | 0x8000000000000080 |
| 19 | 0x000000000000800A |
| 20 | 0x800000008000000A |
| 21 | 0x8000000080008081 |
| 22 | 0x8000000000008080 |
| 23 | 0x0000000080000001 |
| 24 | 0x8000000080008008 |

F I G. 19
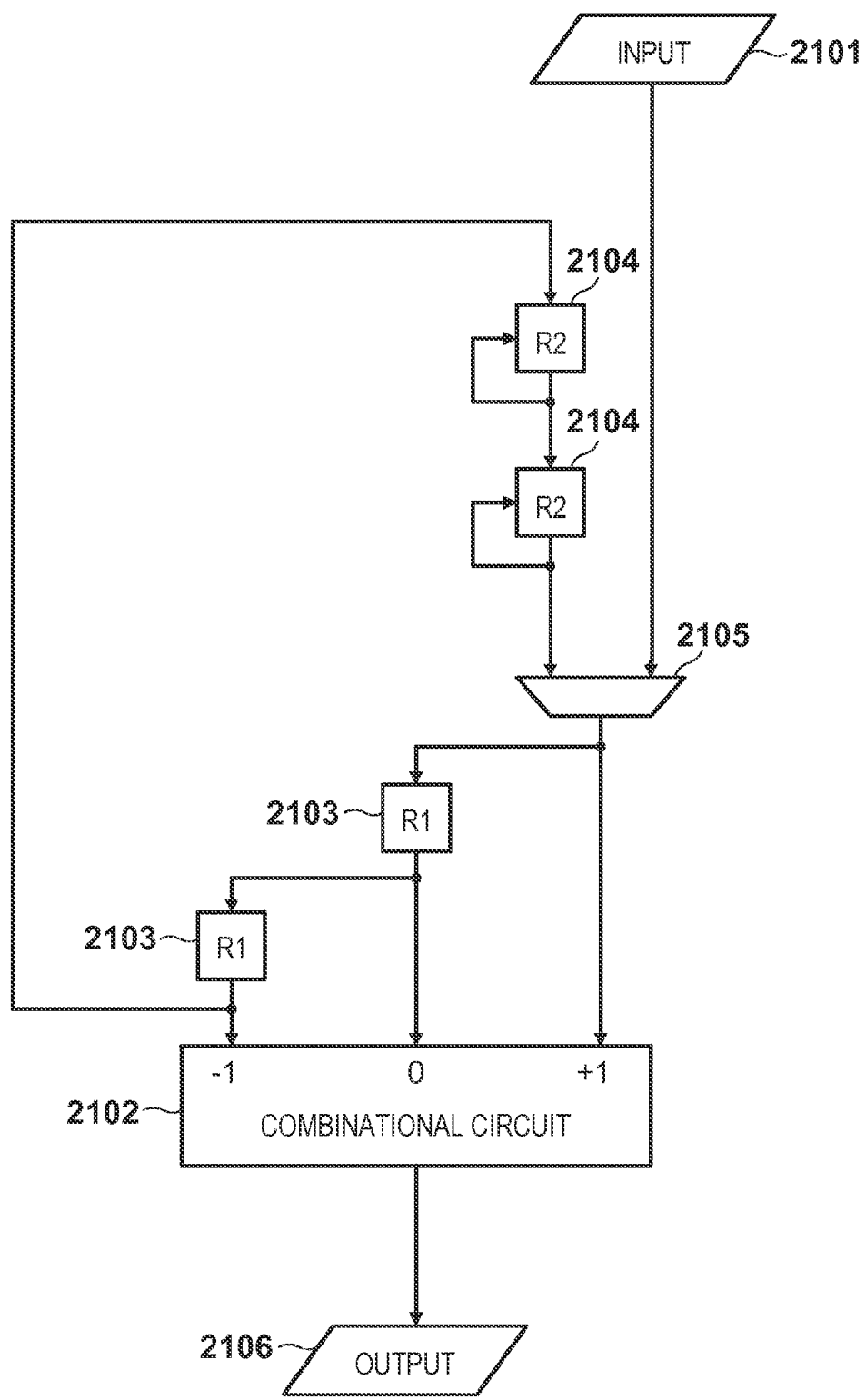

HASH VALUE GENERATION APPARATUS

BACKGROUND OF THE INVENTION

Field of the Invention

The present invention relates to a hash value generation technique.

Description of the Related Art

To verify whether data has been falsified, a hash value calculated using a cryptographic hash algorithm is used. It has been already proved that SHA-1 as a cryptographic hash algorithm cannot ensure security, and it has been pointed out that security of the SHA-2 family (SHA-224, SHA-256, SHA-384, and SHA-512) may collapse. To solve this problem, the National Institute of Standards and Technology (NIST) sought submissions of new algorithms from the public to stipulate a next generation cryptographic hash algorithm (called SHA-3). The KECCAK algorithm ("The KECCAK reference", Version 3.0, Jan. 14, 2011, (http://keccak.noekeon.org/Keccak-reference-3.0.pdf) (non-patent literature 1)) was chosen as the SHA-3 algorithm in October 2012.

In SHA-3, four lengths (224 bits, 256 bits, 384 bits, and 512 bits) are defined as the length (size) of a cryptographic hash value to be output. A cryptographic hash value having a fixed length is output for an input message (data) having an arbitrary length. In the KECCAK algorithm, a permutation function of repeating, 24 times, a round process which sequentially applies five steps ($\theta$, $\rho$, $\pi$, $\chi$, and $\iota$) is used. The round process is executed for 1600-bit data called "state".

In step $\pi$ included in the round process of the above-described KECCAK algorithm, a parallel process using a data structure called "sheet" or "plane" as a unit is impossible. To increase the speed at which a hash value is generated, a pipeline process may be executed using a data structure called "lane" as a unit. More specifically, except for step $\pi$, a two-pipeline structure including steps $\theta$ and $\rho$ (to be referred to as $\theta$ & $\rho$ hereinafter) and steps $\chi$ and $\iota$ (to be referred to as $\chi$ & $\iota$ hereinafter) is plausible.

If, however, a hash value is generated using a lane structure as a unit, it is impossible to perform the parallel operation of the two pipelines of $\theta$ & $\rho$ and $\chi$ & $\iota$, thereby making it difficult to increase the speed. Furthermore, if a hash value is generated using a lane structure as a unit, it is impossible to start a subsequent round process until all the results of a preceding round process (the entire "state") are temporarily written in a memory. It is, therefore, impossible to perform the parallel operation of the two pipelines between two continuous round processes, thereby making it difficult to increase the speed.

SUMMARY OF THE INVENTION

According to an aspect of the present invention, a hash value generation apparatus comprises: a $\theta$ operation unit configured to execute a $\theta$ operation included in a round process of a SHA-3 algorithm; a $\rho$ operation unit configured to execute a $\rho$ operation included in the round process; a $\pi$ operation unit configured to execute a $\pi$ operation included in the round process; a $\chi$ operation unit configured to execute a $\chi$ operation included in the round process; and an $\iota$ operation unit configured to execute an $\iota$ operation included in the round process, wherein the $\theta$ operation unit receives data for each sheet structure, and starts to execute the $\theta$ operation upon receiving data of three sheet structures.

According to another aspect of the present invention, a hash value generation apparatus comprises: a round process unit configured to perform a round process of a hash algorithm for data with a structure having m bits in an x-axis direction, n bits in a y-axis direction, and s bits in a z-axis direction, the round process unit comprising a first operation unit configured to calculate a sum of bits in the y-axis direction, and add the calculated sum to a bit at a predetermined position, a second operation unit configured to permute values of respective bits within an x-y plane, a third operation unit configured to rotate a value of each bit in the z-axis direction, a fourth operation unit configured to perform bitwise combination within a bit string in the x-axis direction, and a fifth operation unit configured to add a predetermined value to each bit, wherein the first operation unit receives data for a predetermined unit defined as a structure having 1 bit in the x-axis direction, n bits in the y-axis direction, and s bits in the z-axis direction, and starts an operation upon receiving data of three predetermined units.

According to still another aspect of the present invention, a hash value generation apparatus for generating a hash value based on a SHA-3 algorithm, comprises: a $\theta$ operation unit, a $\rho$ operation unit, a $\pi$ operation unit, a $\chi$ operation unit, and an $\iota$ operation unit for executing five operations including a $\theta$ operation, $\rho$ operation, $\pi$ operation, $\chi$ operation, and $\iota$ operation included in a round process of the SHA-3 algorithm, respectively, wherein the $\theta$ operation unit and the $\iota$ operation unit are configured to process data for each sheet structure, and the $\theta$ operation unit is configured to start the $\theta$ operation before all sheet structures forming one state structure are input from the $\iota$ operation unit.

The present invention enables improvement in throughput for generating a hash value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view for explaining an operation in step $\rho$;

FIG. 16 is a table showing a round constant in step $\iota$;

FIG. 19 is a view showing an implementation example of a θ & ρ operation circuit;

DESCRIPTION OF THE EMBODIMENTS

Preferred embodiments of the present invention will be described in detail below with reference to the accompanying drawings. Note that the following embodiments are merely examples, and do not intend to limit the scope of the present invention.

First Embodiment

As the first embodiment of a hash value generation apparatus according to the present invention, an apparatus for generating a hash value of SHA-3 (KECCAK algorithm) will be exemplified. Note that in the following explanation, a specific data length and bit value may be indicated but the present invention is not limited to them.
<Prior Technique>

The KECCAK algorithm as a prior technique will be explained first. Note that more detailed specifications are given in non-patent literature 1 described in "BACKGROUND OF THE INVENTION"

Figure 1:
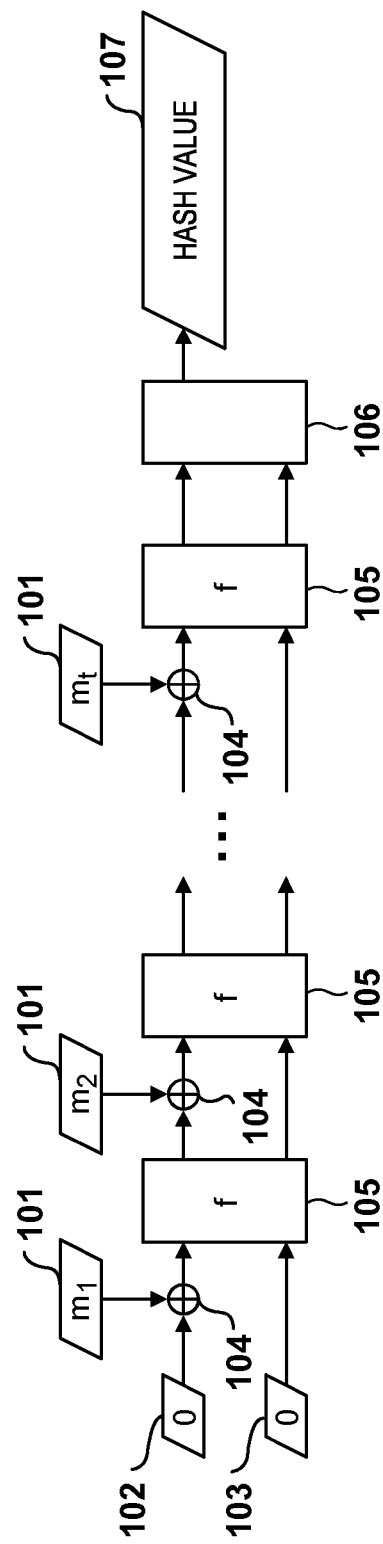
FIG. 1 is a view showing an overview of the whole KECCAK algorithm.

FIG. 1 is a view showing an overview of the whole KECCAK algorithm. Reference numeral 101 denotes message blocks ($m_1$ to $m_t$). The message blocks ($m_1$ to $m_t$) are generated by dividing, by 1024 bits, an input message for which a hash value is to be generated.

Reference numerals 102 and 103 denote initial values, respectively. All bits of each initial value are 0. Although a case in which all bits of the initial value are 0 will be described, the present invention is not limited to this. Furthermore, the initial value 102 has a length of 1024 bits which is equal to that of the above-described message block, and the total length of the initial values 102 and 103 is 1600 bits. Reference numeral 104 denotes a bitwise exclusive OR (XOR) operation unit. That is, the XOR operation unit 104 outputs, as 1024-bit data, a result of exclusive-ORing two 1024-bit input data for each bit.

Reference numeral 105 denotes a permutation function KECCAK-f, which receives two input data and outputs two data. The permutation function KECCAK-f 105 will be described in detail later with reference to FIG. 2. Reference numeral 106 denotes an extraction unit which extracts data having a necessary size from 1024-bit input data, and outputs it; and 107, a cryptographic hash value (that is, hash value) as the calculation result of the algorithm.

Figure 2:
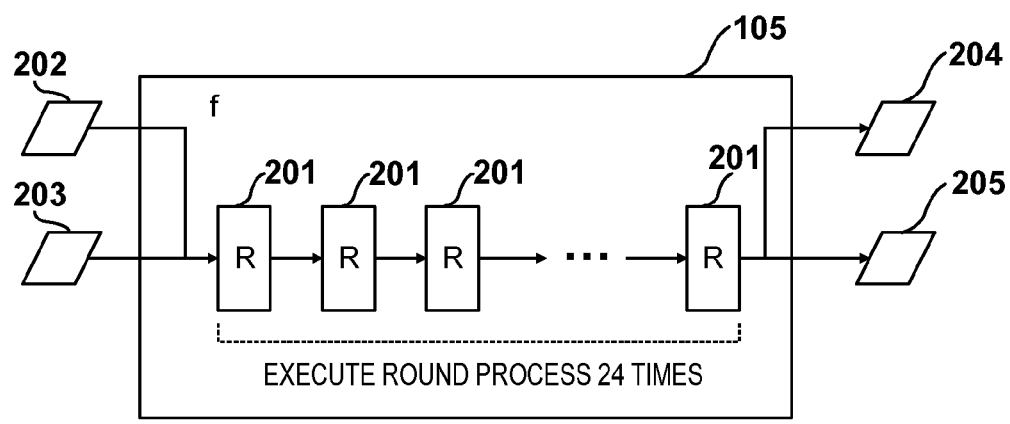
FIG. 2 is a view for explaining an overview of a permutation function KECCAK-f 105.

FIG. 2 is a view for explaining an overview of the permutation function KECCAK-f 105. Reference numeral 201 denotes a round process R, which is executed 24 times. Details of the round process R will be described later. Reference numerals 202 and 203 denote input data, respectively. The length of the input data 202 is 1024 bits. The total length of the input data 202 and 203 is 1600 bits. The two input data 202 and 203 are concatenated and input to the round process R 201. Reference numerals 204 and 205 denote output data, respectively. The length of the output data 204 is 1024 bits. The total length of the output data 204 and 205 is 1600 bits.

Figure 3:
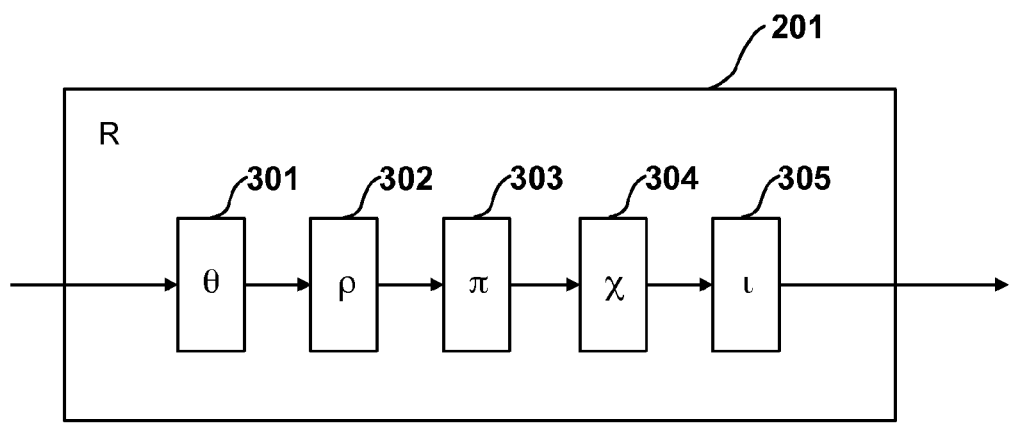
FIG. 3 is a view for explaining an overview of a round process R 201.

FIG. 3 is a view for explaining an overview of the round process R 201. As described above, in the round process R 201, the lengths of the input data and output data are both 1600 bits. In the round process R 201, operations in five steps (θ, ρ, π, χ, and ι operations) (to be described later) are sequentially applied to the input data, thereby generating output data.

Data structures used in the round process of the KECCAK algorithm and five steps described above will be explained in detail below.

Figure 4:
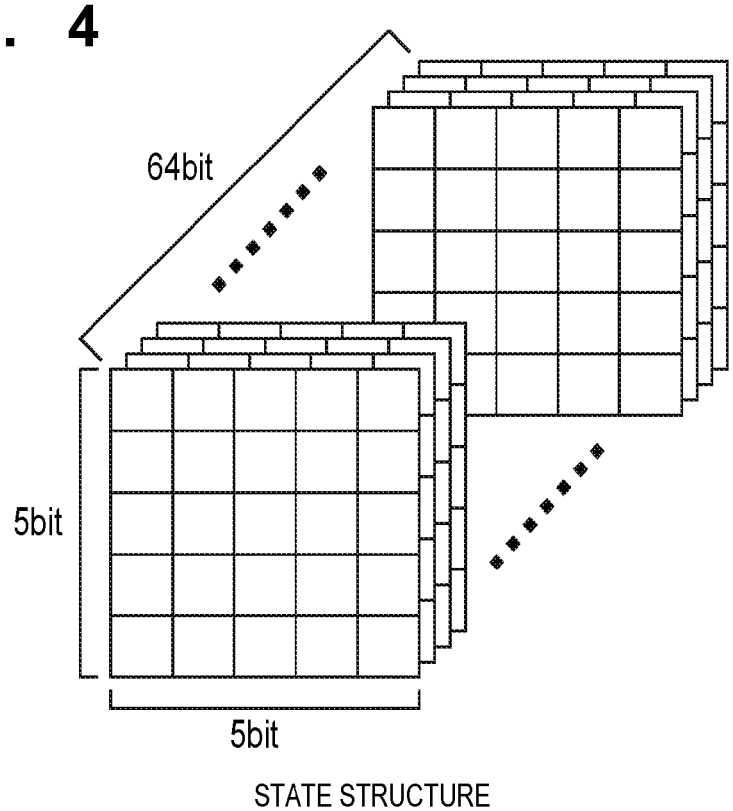
FIG. 4 is a view for explaining a data structure "state" used in input and output operations of the round process R 201.

FIG. 4 is a view for explaining a data structure "state" used in input and output operations of the round process R 201. As described above, the lengths of the input data and output data are both 1600 bits. The 1600-bit data is represented as a rectangular parallelepiped having a width (x-axis direction) of 5 bits, a height (y-axis direction) of 5 bits, and a depth (z-axis direction) of 64 bits in a three-dimensional array. This rectangular parallelepiped data structure is called "state". Note that 1600-bit data is assigned to the state structure represented as a rectangular parallelepiped in the order of z-axis, x-axis, and y-axis directions, details of which will be described later with reference to FIG. 9.

Figure 5:
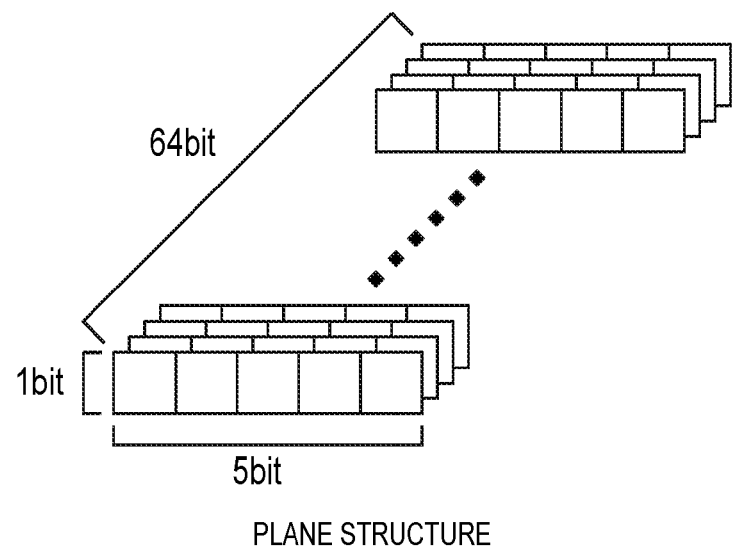
FIG. 5 is a view for explaining a data structure "plane"

FIG. 5 is a view for explaining a data structure "plane". The plane structure is represented as a planar structure which has a width of 5 bits, a height of 1 bit, and a depth of 64 bits and is parallel to the x-z plane. That is, the above-described state structure can be considered as a structure obtained by stacking five plane structures in the y-axis direction.

Figure 6:
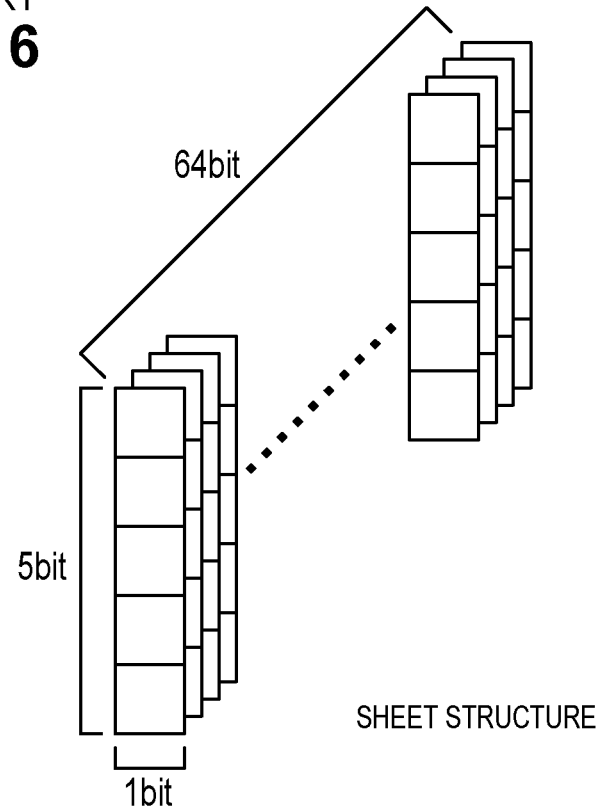
FIG. 6 is a view for explaining a data structure "sheet"

FIG. 6 is a view for explaining a data structure "sheet". The sheet structure is represented as a planar structure which has a width of 1 bit, a height of 5 bits, and a depth of 64 bits and is parallel to the y-z plane. That is, the above-described state structure can be considered as a structure obtained by arranging five sheet structures in the x-axis direction.

Figure 7:
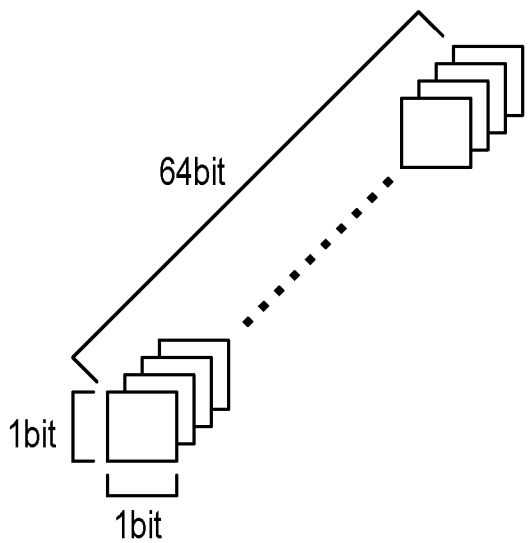
FIG. 7 is a view for explaining a data structure "lane"
Figure 9:
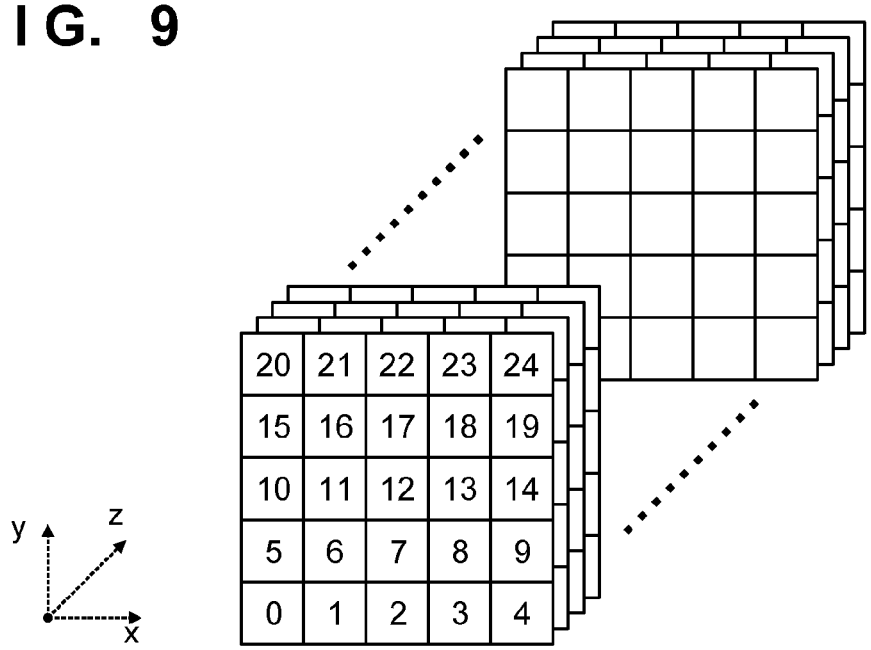
FIG. 9 is a view showing the order of "lane" structures forming a "state" structure.

FIG. 7 is a view for explaining a data structure "lane". The lane structure is represented as a linear structure which has a width of 1 bit, a height of 1 bit, and a depth of 64 bits and is parallel to the z-axis. That is, the above-described state structure can be considered as a structure obtained by arranging 25 lane structures along the x-y plane. FIG. 9 is a view showing the order of the 25 lane structures forming the one state structure.

Figure 8:
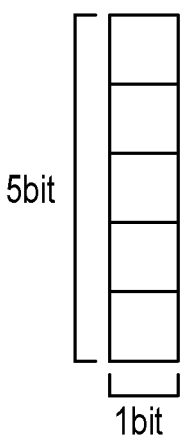
FIG. 8 is a view for explaining a data structure "column"

FIG. 8 is a view for explaining a data structure "column". The column structure is represented as a linear structure which has a width of 1 bit, a height of 5 bits, and a depth of 1 bit and is parallel to the y-axis. That is, the above-described sheet structure can be considered as a structure obtained by arranging 64 column structures in the z-axis direction.

Note that although a case in which the input data has a length of 1600 bits will be described in the first embodiment, the present invention is not limited to this. Furthermore, although data with the state structure is processed as a rectangular parallelepiped data structure having a width (x-axis direction) of 5 bits, a height (y-axis direction) of 5 bits, and a depth (z-axis direction) of 64 bits will be explained, the present invention is not limited to this. For example, the input data may have a length of 800 bits, and data with the state structure may be processed as a rectangular parallelepiped data structure having a width of 5 bits, a height of 5 bits, and a depth of 32 bits.

Moreover, the plane structure, sheet structure, lane structure, and column structure are changed according to the number of bits of each of the width (x-axis direction), height (y-axis direction), and depth (z-axis direction) of the state structure. That is, assume that data with the state structure have m bits in the x-axis direction, n bits in the y-axis direction, and s bits in the z-axis direction. In this case, the plane structure is a planar structure having m bits in the x-axis direction, 1 bit in the y-axis direction, and s bits in the z-axis direction. The sheet structure is a planar structure having 1 bit in the x-axis direction, n bits in the y-axis direction, and s bits in the z-axis direction. The lane structure is a linear structure having 1 bit in the x-axis direction, 1 bit in the y-axis direction, and s bits in the z-axis direction. The column structure is a linear structure having 1 bit in the x-axis direction, n bits in the y-axis direction, and 1 bit in the z-axis direction.

A method of generating input data to the first round process R 201 based on the input data 202 and 203 input to the KECCAK-f 105 will be described. The input data 202 and 203 are sequentially concatenated to generate a 1600-bit data block. The 1600-bit data is divided by 64 bits to generate 25 lane structures. Finally, the 25 lane structures are arranged along the x-y plane in the numerical order shown in FIG. 9, thereby forming one state structure. The thus generated state structure is input to the round process R 201. Note that a method of generating the output data 204 and 205 based on the output data of the 24th round process R 201 is similar to that described above, and a description thereof will be omitted.

Five steps (steps θ, ρ, π, χ, and ι) constituting the round process R 201 will be explained. Note that in each step, each of input data and output data has a state structure.

Figure 10:
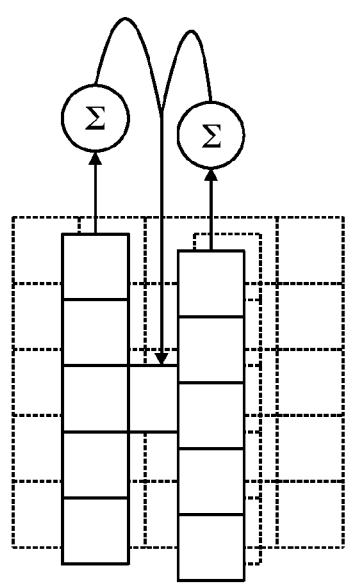
FIG. 10 is a view for explaining an operation in step $\theta$.

FIG. 10 is a view for explaining the operation in step θ. In step θ, the sum of two adjacent columns is added to each bit. More specifically, each bit of the output state structure is calculated as the sum of three values of the input state structure, that is, the sum of "the value of a bit at the same position", "the sum of the bits of a column at the −1 position in the x-axis direction", and "the sum of the bits of a column at the +1 position in the x-axis direction and at the −1 position in the z-axis direction". The sum indicates a sum in GF(2), and indicates the same result as that of an exclusive OR operation, as given by:

$$a'[x][y][z] \leftarrow a[x][y][z] + \sum_{y'=0}^{4} a[x-1][y'][z] + \sum_{y'=0}^{4} a[x+1][y'][z-1]$$

where x falls within the range from 0 to 4, y falls within the range from 0 to 4, and z falls within the range from 0 to 63.

Figure 11:
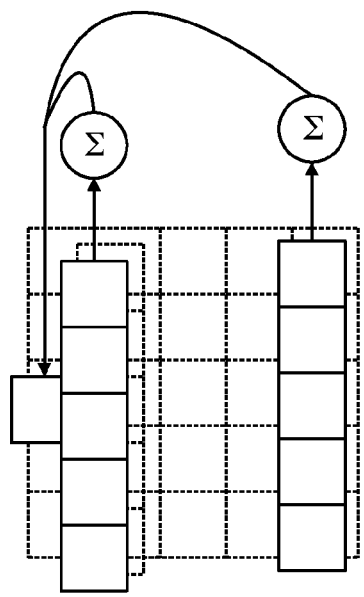
FIG. 11 is a view for explaining the operation in step $\theta$ (when obtaining a bit at x=0)

FIG. 11 is a view for explaining the operation in step θ when obtaining a bit of an edge portion (for example, x=0). To obtain a bit at x=0, "a column at the −1 position in the x-axis direction" corresponds to the opposite side of the state structure, that is, "a column at x=4". In this way, coordinates outside the state structure are set at a position on the opposite side of the state structure. That is, a coordinate value rotates within one state structure. This rule equally applies to x, y, and z coordinates, and to the remaining four steps.

FIG. 12 is a view for explaining the operation in step ρ. In step ρ, the value of each bit is rotated (cyclic shifted) in the z-axis direction. More specifically, each value in each lane structure of the state structure is rotated in the z direction by a specified number of bits, and is then output. The number of bits (shift amount) by which each value in each lane structure is rotated is determined in advance, and is indicated by each number shown in the lower portion of FIG. 12.

Figure 13:
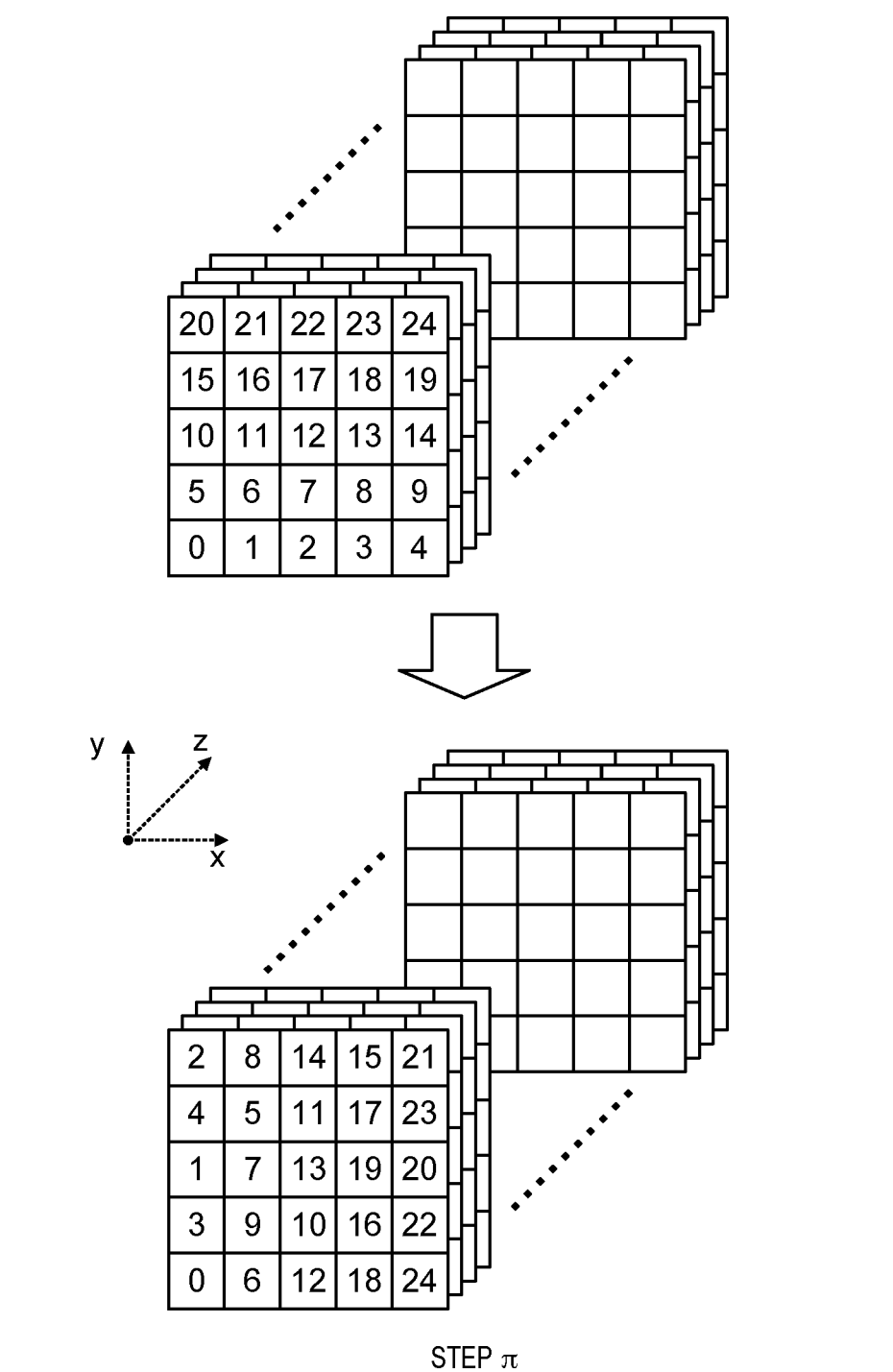
FIG. 13 is a view for explaining an operation in step $\pi$.

FIG. 13 is a view for explaining the operation in step π. In step π, an operation of permuting the values of the respective bits within the x-y plane (to be also referred to as a "slice" hereinafter), that is, an operation of permuting the 25 lane structures of the one state structure is performed. More specifically, if numbers are assigned to the respective lane structures of the input state structure as shown in the upper portion of FIG. 13, an output state structure shown in the lower portion of FIG. 13 is obtained.

Figure 14:
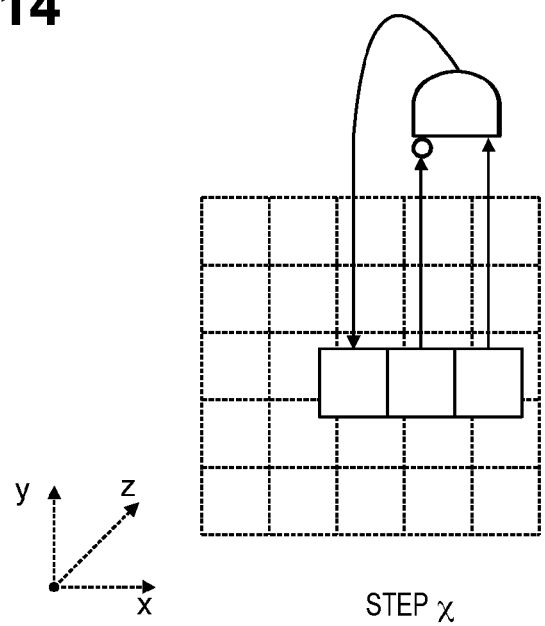
FIG. 14 is a view for explaining an operation in step $\chi$.

FIG. 14 is a view for explaining the operation in step χ. In step χ, bitwise combination is performed within a bit string in the x-axis direction (to be also referred to as a "row" hereinafter), and the value of each bit of an output row is derived based on three bits of one input row. More specifically, when, with respect to each bit of an input row, a bit at the +1 position in the x-axis direction is 0 and a bit at the +2 position in the x-axis direction is 1, a value obtained by inverting the value of the bit is set as the value of a corresponding bit of an output row.

Figure 15:
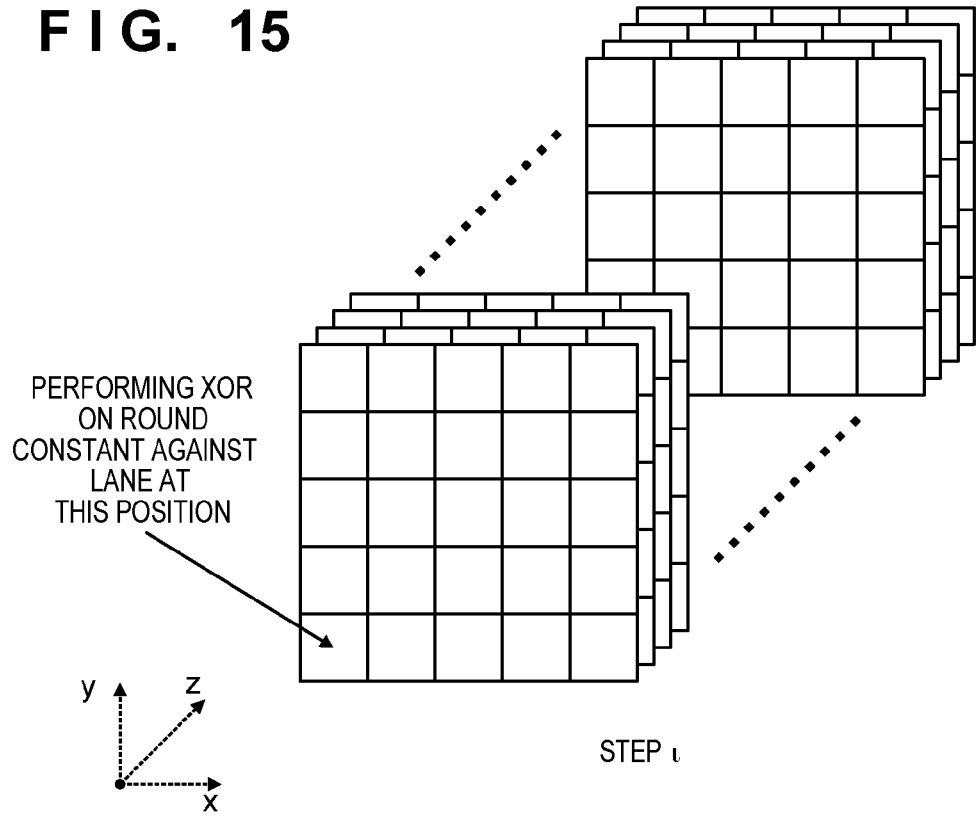
FIG. 15 is a view for explaining an operation in step $\iota$.

FIG. 15 is a view for explaining the operation in step ι. In step ι, a round constant is added to each bit. FIG. 16 is a table showing a round constant in step ι. In step ι, an exclusive OR (XOR) operation with a round constant (64-bit value) determined in advance for each round is performed for the bit string of a lane structure at x=y=0. More specifically, the 64-bit value (assume that a bit at z=63 is MSB and a bit at z=0 is LSB) of the lane structure at x=y=0 and the round constant shown in FIG. 16 are exclusive-ORed for each bit. The obtained result is set as the bit string of the lane structure at x=y=0 of the output state structure.

It is apparent from the above-described operation contents in each step (step θ, ρ, π, χ, or ι) that the following constraint is imposed on the start of the operation in each step.

In step θ, data of sheet structures at the −1 and +1 positions in the x-axis direction are used for calculation of each lane structure of the state structure. That is, when data of three sheet structures are prepared, the operation in step θ can be started.

In step ρ, an individual calculation operation is performed for each lane structure. Therefore, when the calculation result of the preceding stage (step θ) is output for one lane structure, the operation in step ρ can be started.

In step π, the respective lane structures of the state structure are permuted. Therefore, when the calculation result of the preceding stage (step ρ) is output for the whole state structure, the operation in step π can be started.

In step χ, lane structures at the +1 and +2 positions in the x-axis direction are used for calculation of each lane structure of the state structure. Therefore, when data of three sheet structures are prepared, the operation in step χ can be started.

In step ι, an individual calculation operation is performed for each lane structure. Therefore, when the calculation result of the preceding stage (step χ) is output for one lane structure, the operation in step ι can be started.

That is, in step θ or χ, when data for at least three sheet structures are output and received from the step of the preceding stage, the operation can be started.

In other words, it is seen that performing an operation for each sheet structure makes it possible to start to execute the first stage (step θ) of the succeeding round when data of three sheet structures are output from the last stage (step ι) of the preceding round. An arrangement for performing a round process for each sheet structure will be described below.

<Apparatus Arrangement and Operation>

Figure 17:
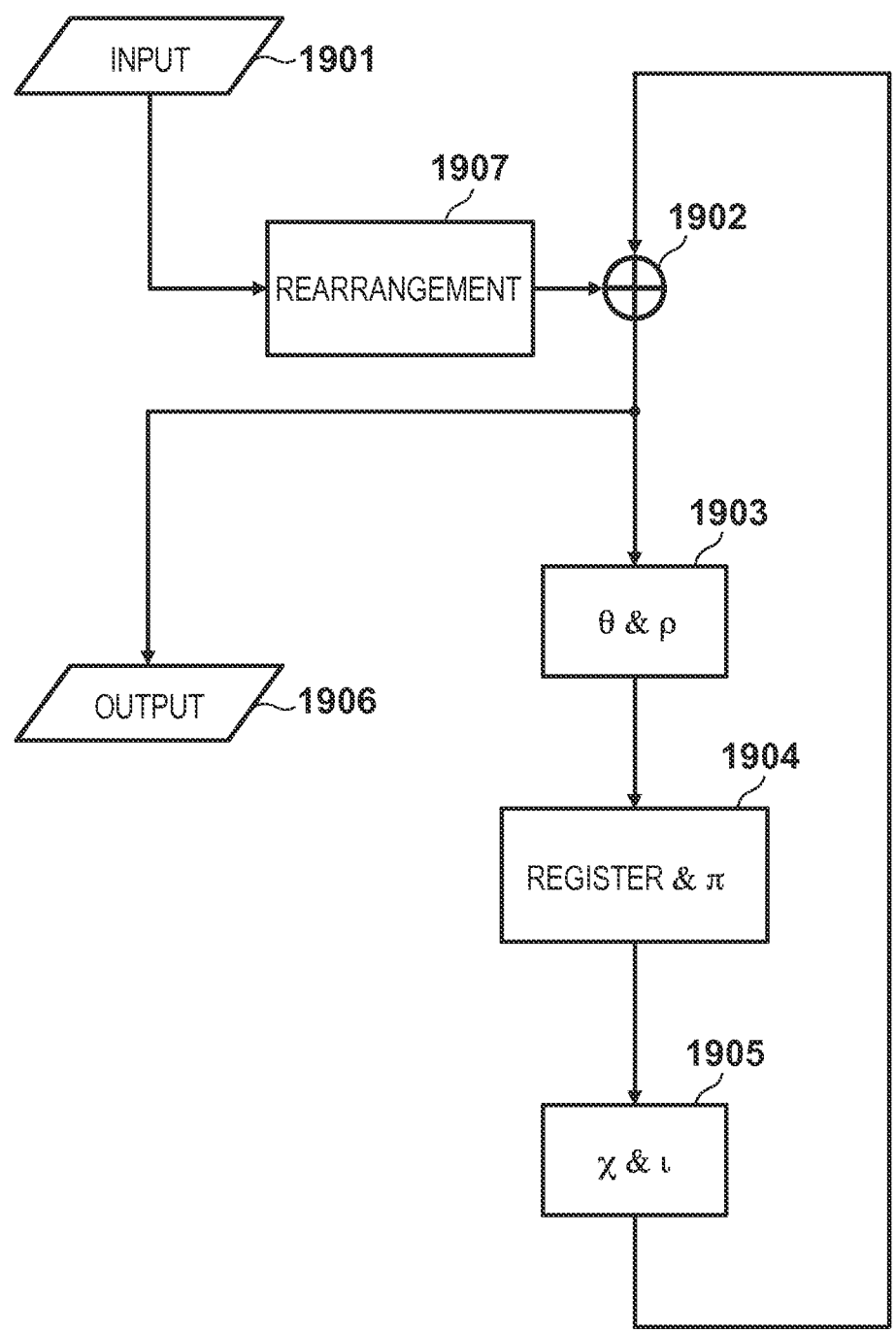
FIG. 17 is a view showing the schematic arrangement of an implementation example of the KECCAK algorithm according to the first embodiment.

FIG. 17 is a view showing the schematic arrangement of an implementation example of the KECCAK algorithm according to the first embodiment. Reference numeral 1901 denotes input data. Reference numeral 1907 denotes a processing block for holding data for one state structure, which is the input data 1901, and rearranging the data for each sheet structure. More specifically, the processing block 1907 divides the 1600-bit data by 64 bits, thereby generating 25 lane structures. The processing block 1907 then arranges the 25 lane structures along the x-y plane in the numerical order shown in FIG. 9, thereby generating one sheet structure. That is, the processing block 1907 rearranges the input data instead of generating data with a sheet structure along the y-z plane in the order of the input data. Note that when at least data capable of generating data of the first sheet structure is held, the data of the first sheet structure may be output. Reference numeral 1906 denotes output data which is output for each sheet structure upon completion of calculation.

Reference numeral 1902 denotes an exclusive OR (XOR) operation unit which exclusive-ORs a message block and internal data every time the round process is performed 24 times; 1903, a processing block for simultaneously performing steps θ and ρ; 1904, a processing block including a register for holding the entire internal data and an operation unit for performing step π; and 1905, a processing block for simultaneously performing steps χ and ι.

Figure 18:
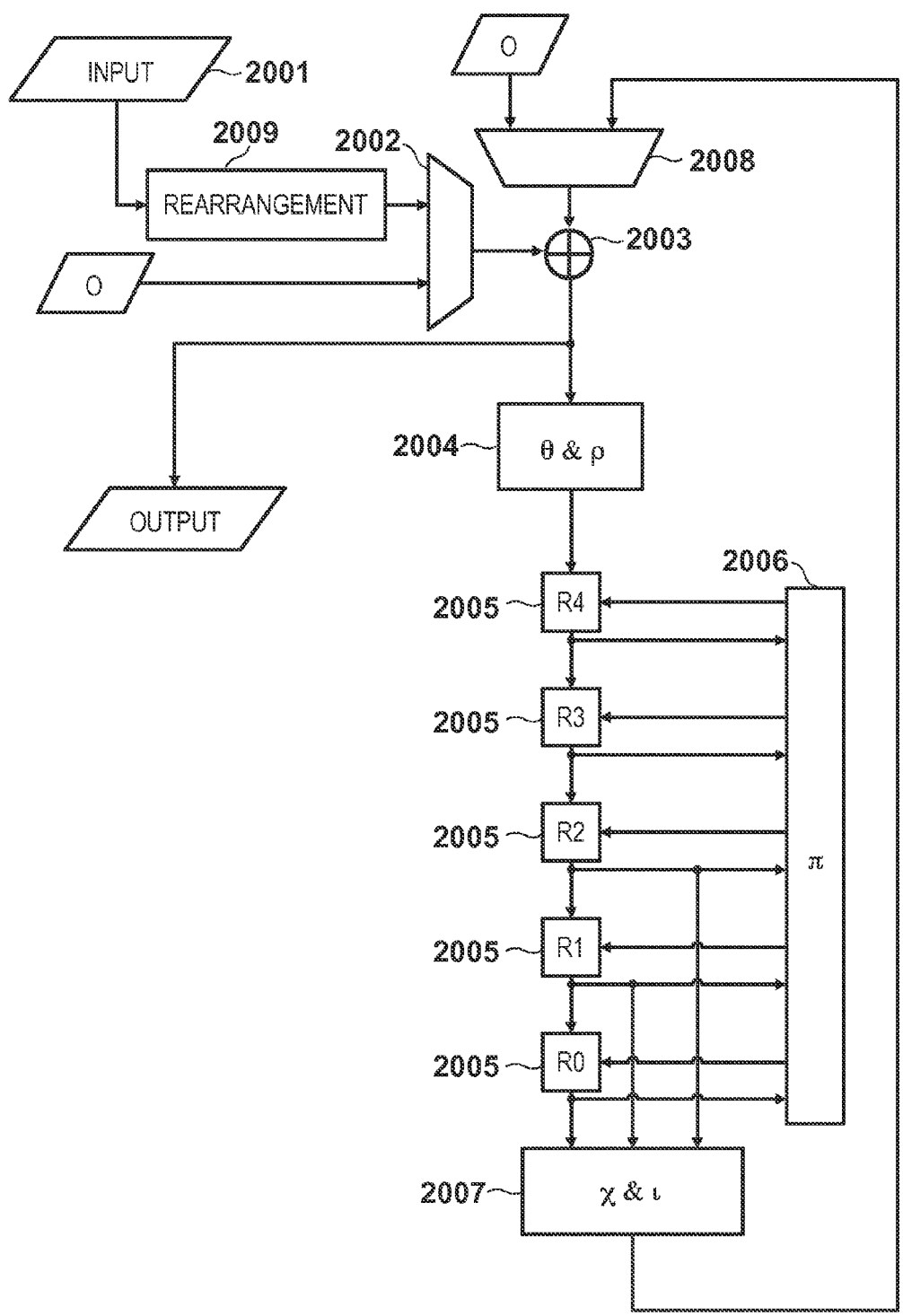
FIG. 18 is a view showing details of the arrangement shown in FIG. 17.

FIG. 18 is a view showing details of the arrangement shown in FIG. 17. Reference numeral 2001 denotes input data; and 2009, a processing block for rearranging the input data 2001 for each sheet structure. The processing block 2009 is the same as the processing block 1907 and a description thereof will be omitted. The processing block 2009 outputs one sheet structure for one clock. In this example, the processing block 2009 outputs sheet structures in ascending order of x coordinates. Reference numeral 2002 denotes a multiplexer. If the input data and internal state structure are exclusive-ORed, the multiplexer 2002 outputs the input data intact; otherwise, it outputs 0.

Reference numeral 2004 denotes a circuit (to be referred to as a θ & ρ circuit hereinafter) for calculating steps θ and ρ. As described above, the circuit 2004 receives data of sheet structures in ascending order of x coordinates (the order of x=0, 1, 2, 3, and 4). Note that sheet structures are output in the order of x=1, 2, 3, 4, and 0. Reference numeral 2005 denotes a five-stage register, each stage of which stores information of one sheet structure. The five-stage register 2005 transfers stored data to the succeeding stage for one clock.

Reference numeral 2006 denotes a circuit for processing step π. The register 2005 generally holds data input from upstream of it but is configured to hold, when executing step π, output data from the circuit 2006.

Reference numeral 2007 denotes a circuit (to be referred to as a χ & ι circuit hereinafter) for processing steps χ and ι, which outputs each sheet structure as a result; and 2008, a multiplexer. When calculation of a hash value starts, the multiplexer 2008 outputs 0 for initialization; otherwise, it outputs data in the middle of calculation intact.

FIG. 19 is a view showing an implementation example of the θ & ρ operation circuit. The θ & ρ circuit 2004 calculates output data using a sheet structure of interest and two sheet structures at the −1 and +1 positions in the x-axis direction with respect to the sheet structure of interest.

Reference numeral 2101 denotes input data. As described above, one sheet structure is input as input data for one clock. Reference numeral 2102 denotes a combinational circuit which serves as a logical circuit for actually performing the operations in steps θ and ρ described above.

Reference numeral 2103 denotes a two-stage register, each stage of which stores information of one sheet structure; and 2104, a two-stage register, each stage of which stores information of one sheet structure. In this example, the two-stage register 2104 stores information of sheet structures at x=0 and x=1.

Reference numeral 2105 denotes a multiplexer which outputs the input data 2101 intact for the first five clocks after the start of the operation, and outputs data from the two-stage register 2104 for two succeeding clocks. Reference numeral 2106 denotes output data which is output for each sheet structure. Note that in the arrangement shown in FIG. 19, sheet structures are output in the order of x=1, 2, 3, 4, and 0. That is, since sheet structures are received from the input data 2101 in the order of x=0, 1, 2, 3, and 4, the sheet structure at x=1 becomes outputtable first.

Figure 20:
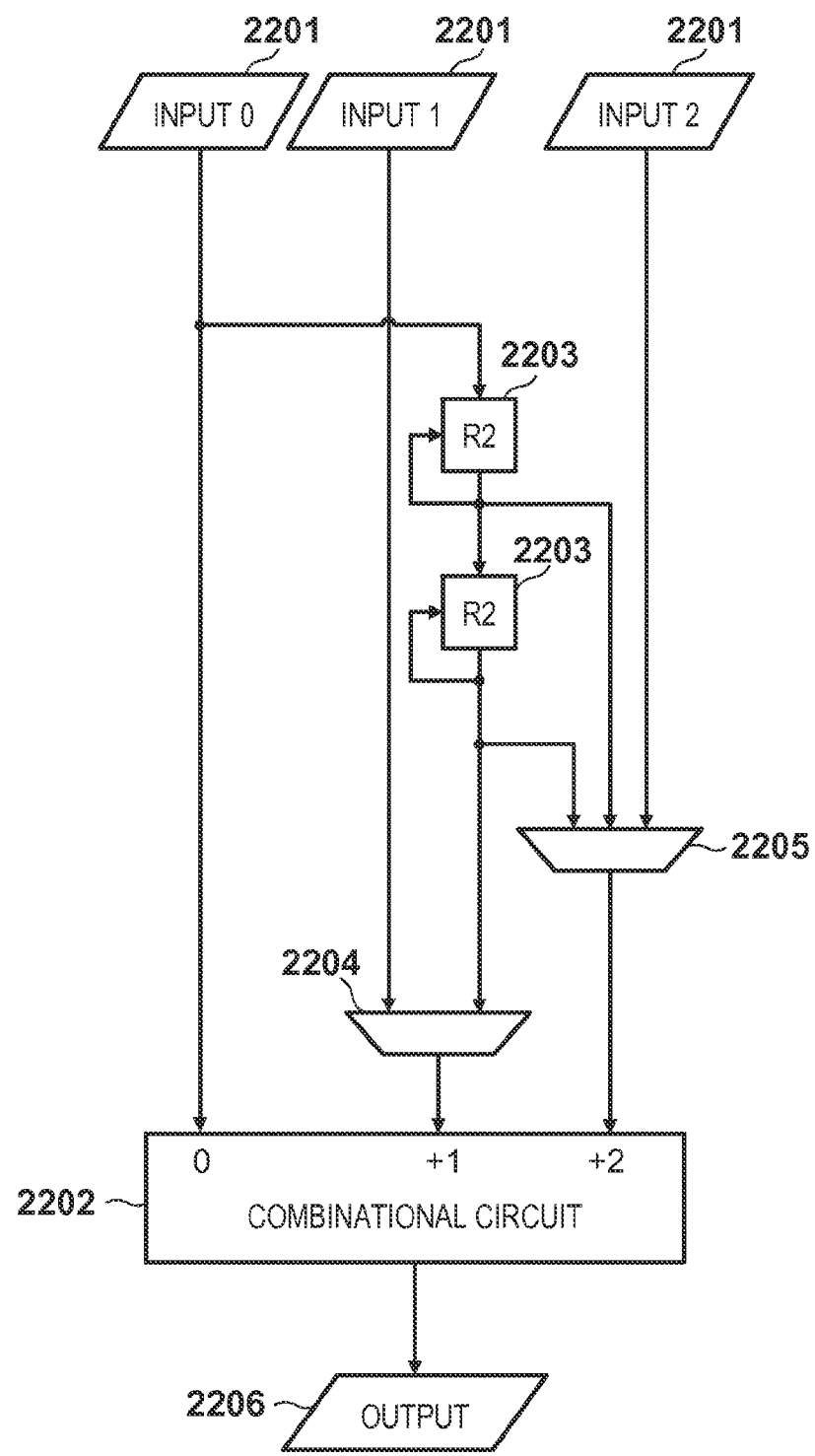
FIG. 20 is a view showing an implementation example of a χ & ι operation circuit.

FIG. 20 is a view showing an implementation example of the χ & ι operation circuit. The χ & ι circuit 2007 calculates output data using a sheet structure of interest and two sheet structures at the +1 and +2 positions in the x-axis direction with respect to the sheet structure of interest.

Reference numeral 2201 denotes input data. As described above, data for three sheet structures are input, as input data, from the register of the preceding stage for one clock. Reference numeral 2202 denotes a combinational circuit which serves as a logical circuit for actually performing the operations in steps χ and ι described above; 2203, a two-stage register, each stage of which stores information of one sheet structure, and which stores sheet structures at x=0 and x=1; 2204, a multiplexer which outputs the input data 2201 intact for the first four clocks after the start of the operation, and outputs a value from the register 2203 for one succeeding clock; 2205, a multiplexer which outputs the input data 2201 intact for the first three clocks after the start of the operation, and outputs a value from the register 2203 for two succeeding clocks; and 2206, output data which is output for each sheet structure.

As described above, the implementation example according to the first embodiment is characterized in that a path from the output of the χ & ι circuit 2007 to the input of the θ & ρ circuit 2004 is connected to only the combinational circuit. That is, the arrangement includes no latch circuit, and thus can pass data within one clock.

Figure 21:
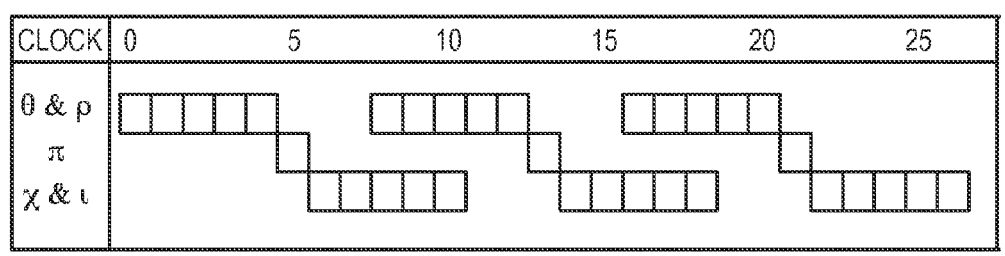
FIG. 21 is a timing chart showing the operation of each module of an implementation example according to the first embodiment.

FIG. 21 is a timing chart showing the operation of each module of the implementation example according to the first embodiment. Note that the θ & ρ circuit 2004 and χ & ι circuit 2007 are configured to be pipeline-processed. It is apparent from FIG. 21 that the θ & ρ circuit 2004 can output one sheet structure two clocks after the χ & ι circuit 2007 outputs one sheet structure. That is, it is apparent that the θ & ρ circuit 2004 can start an operation when three sheet structures are input, and the parallel operation of the θ & ρ circuit 2004 and χ & ι circuit 2007 is realized. It is also apparent that the time taken for one round process is eight clocks on average.

<Case in which Processing is Performed Using Lane Structure as Unit>

An implementation example, in which processing is performed using a lane structure as a unit, to be compared with the above-described implementation example according to the first embodiment will be explained below.

Figure 22:
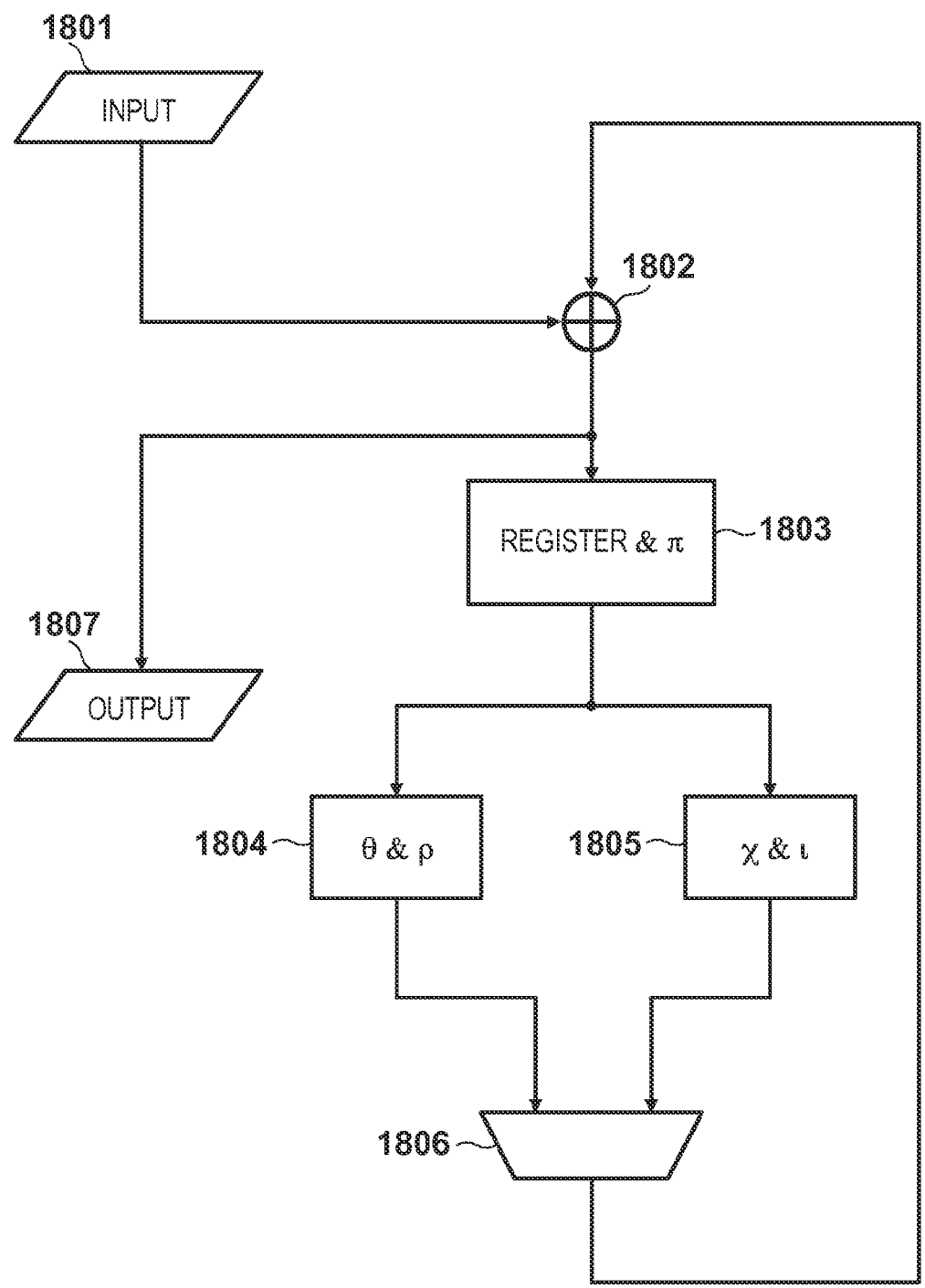
FIG. 22 is a view showing the schematic arrangement of an implementation example when the KECCAK algorithm is processed using a lane structure as a unit.

FIG. 22 is a view showing the schematic arrangement of an implementation example when the KECCAK algorithm is processed using a lane structure as a unit. Note that the operations in five steps (θ, ρ, π, χ, and ι) are the same as those described above and a description thereof will be omitted.

Reference numeral 1801 denotes input data. One lane structure (64-bit data) is received from the input data 1801 for one clock. Note that lane structures are received from one state structure in the order shown in FIG. 9.

Reference numeral 1802 denotes an operation unit for exclusive-ORing a message block and internal data every time the round process is executed 24 times.

Reference numeral 1803 denotes a register for holding the entire internal data and a processing block for executing step π. Note that as described above, the operation in step π becomes executable only after the operation in step ρ is completed. Reference numeral 1804 denotes a processing block for executing steps θ and ρ.

Reference numeral 1805 denotes a processing block for executing steps χ and ι; 1806, a multiplexer which outputs data from the processing block 1804 for the first half of the round process, and outputs data from the processing block 1805 for the second half of the round process; and 1807, output data which is output for each lane structure upon completion of calculation.

Figure 23:
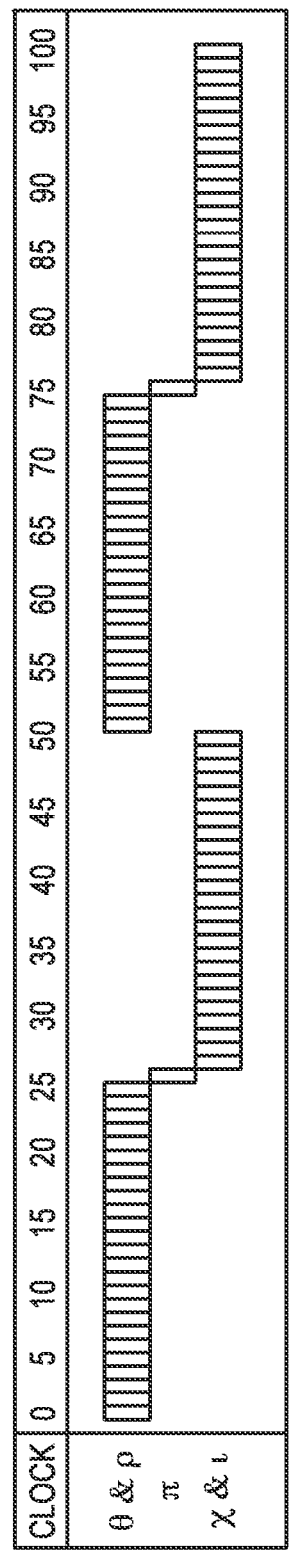
FIG. 23 is a timing chart showing the operation of each module when processing is performed using a lane structure as a unit.

FIG. 23 is a timing chart showing the operation of each module when processing is performed using a lane structure as a unit. It is apparent from FIG. 23 that the θ & ρ circuit 1804 and χ & ι circuit 1805 operate during different periods, and do not operate at the same time. It is also apparent that the time taken for one round process corresponds to 51 clocks.

<Comparison>

As will be apparent by comparing FIGS. 21 and 23 with each other, the processing throughput improves by using the arrangement of the implementation example according to the first embodiment.

That is, it is possible to improve the circuit use efficiency by the parallel operation of two operation circuits including the θ & ρ circuit and χ & ι circuit; and it is possible to execute one round process with a smaller number of clocks (within a shorter time).

As a result, the processing throughput improves.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-241106, filed Oct. 31, 2012, which is hereby incorporated by reference herein in its entirety.

What is claimed is:

1. A hash value generation apparatus comprising:
a rearrangement circuit that rearranges input data into sheet structures defined in a SHA-3 algorithm and outputs data for each sheet structure defined in the SHA-3 algorithm, wherein the sheet structures are parallel to a y-z plane of the input data;
a θ operation unit configured to execute a θ operation included in a round process of a SHA-3 algorithm;
a ρ operation unit configured to execute a ρ operation included in the round process;
a π operation unit configured to execute a π operation included in the round process;
a χ operation unit configured to execute a χ operation included in the round process; and
an ι operation unit configured to execute an ι operation included in the round process,
wherein said θ operation unit receives data for each sheet structure defined in the SHA-3 algorithm from said rearrangement circuit, and starts to execute the θ operation upon receiving data of three sheet structures, and
wherein said θ operation unit and said ρ operation unit output one sheet structure two clock cycles after said χ operation unit and said ι operation unit output one sheet structure.

2. The apparatus according to claim 1, wherein said ι operation unit processes data for each sheet structure, and outputs data for each sheet structure.

3. The apparatus according to claim 1, wherein said θ operation unit receives data for each sheet structure obtained by rearranging a plurality of lane structures in an order along an x-z plane into a plurality of lane structures in an order along a y-z plane.

4. The apparatus according to claim 1, wherein said rearrangement circuit rearranges a plurality of lane structures in an order along an x-z plane into a plurality of lane structures in an order along a y-z plane.

5. The apparatus according to claim 1, further comprising a calculation unit configured to exclusive-OR the input data and data output from said ι operation unit,
wherein said θ operation unit receives data output from said calculation unit.

6. The apparatus according to claim 4, wherein the lane structure is data represented as a structure having 1 bit in an x-axis direction, 1 bit in a y-axis direction, and s bits in a z-axis direction.

7. The apparatus according to claim 1, wherein the sheet structure is data represented as a structure having 1 bit in an x-axis direction, n bits in a y-axis direction, and s bits in a z-axis direction.

8. The apparatus according to claim 1, wherein said θ operation unit adds a sum of two adjacent columns to each bit,
wherein said π operation unit permutes values of respective bits within an x-y plane, wherein said ρ operation unit rotates a value of each bit in a z-axis direction, wherein said χ operation unit performs bitwise combination within a bit string in an x-axis direction, and wherein said ι operation unit adds a round constant to each bit.

9. The apparatus according to claim 1, wherein an output of said ι operation unit and an input of said θ operation unit are connected by only a combinational circuit including no latch circuit.

10. A hash value generation apparatus comprising:
a rearrangement circuit that rearranges input data into structures having 1 bit in the x-axis direction, n bits in the y-axis direction, and s bits in the z-axis direction, and parallel to a y-z plane of the input data and outputs data for each structure having 1 bit in the x-axis direction, n bits in the y-axis direction, and s bits in the z-axis direction; and
a round process unit configured to perform a round process of a hash algorithm for data with a structure having m bits in an x-axis direction, n bits in a y-axis direction, and s bits in a z-axis direction,
said round process unit comprising
(a) a summing circuit that calculates a sum of bits in the y-axis direction, and add the calculated sum to a bit at a predetermined position,
(b) a permutation circuit that permutes values of respective bits within an x-y plane,
(c) a rotation circuit that rotates a value of each bit in the z-axis direction,
(d) a bitwise combination circuit that performs bitwise combination within a bit string in the x-axis direction, and
(e) an addition circuit that adds a predetermined value to each bit,
wherein said summing circuit receives data for a predetermined unit defined as a structure having 1 bit in the x-axis direction, n bits in the y-axis direction, and s bits in the z-axis direction from said rearrangement circuit, and starts an operation upon receiving data of three predetermined units, and
wherein said summing circuit and said permutation circuit output data of one predetermined unit two clock cycles after said bitwise combination circuit and said addition circuit output data of one predetermined unit.

11. The apparatus according to claim 10, wherein said addition circuit processes data for the predetermined unit and outputs data for the predetermined unit.

12. A hash value generation apparatus for generating a hash value based on a SHA-3 algorithm, the apparatus comprising:
a data generation circuit that generates data for each sheet structure defined in a SHA-3 algorithm from the one state structure defined in a SHA-3 algorithm, and inputs the data for each sheet structure defined in the SHA-3 algorithm to a θ operation unit, wherein each sheet structure is parallel to a y-z plane of the input data; and said θ operation unit, a ρ operation unit, a π operation unit, a χ operation unit, and an ι operation unit for executing five operations including a θ operation, ρ operation, π operation, χ operation, and ι operation included in a round process of the SHA-3 algorithm, respectively, wherein said θ operation unit and said ι operation unit are configured to process data for each sheet structure, and wherein said θ operation unit is configured to start the θ operation upon receiving data of three sheet structures, and wherein said θ operation unit and said ρ operation unit output one sheet structure two clock cycles after said χ operation unit and said ι operation unit output one sheet structure.

13. The apparatus according to claim 12, wherein an output of said ι operation unit and an input of said θ operation unit are connected by only a combinational circuit including no latch circuit.

14. The apparatus according to claim 12, wherein said θ operation unit and said ρ operation unit are configured as a θ & ρ operation unit for simultaneously processing the θ operation and the ρ operation,
wherein said χ operation unit and said ι operation unit are configured as a χ & ι operation unit for simultaneously processing the χ operation and the ι operation, and
wherein said θ & ρ operation unit and said χ & ι operation unit are configured to be pipeline-processed.

15. The apparatus according to claim 12, wherein the state structure is represented as a rectangular parallelepiped having m bits in an x-axis direction, n bits in a y-axis direction, and s bits in a z-axis direction, and
wherein the sheet structure is represented as a planar structure having 1 bit in the x-axis direction, n bits in the y-axis direction, and s bits in the z-axis direction.

16. The apparatus according to claim 12, wherein the θ operation is an operation of adding a sum of two adjacent columns to each bit,
wherein the ρ operation is an operation of rotating a value of each bit in a z-axis direction,
wherein the π operation is an operation of permuting values of respective bits within an x-y plane,
wherein the χ operation is an operation of performing bitwise combination within a bit string in an x-axis direction, and
wherein the ι operation is an operation of adding a round constant to each bit.

17. The apparatus according to claim 12, wherein the state structure is formed from five sheet structures, and
wherein said θ operation unit starts the θ operation upon receiving three sheet structures from said ι operation unit.

18. The apparatus according to claim 1, wherein said θ operation unit receives data for each sheet structure defined in the SHA-3 algorithm from said rearrangement circuit for one clock in ascending order of x coordinates.

* * * * *